Figure 1:
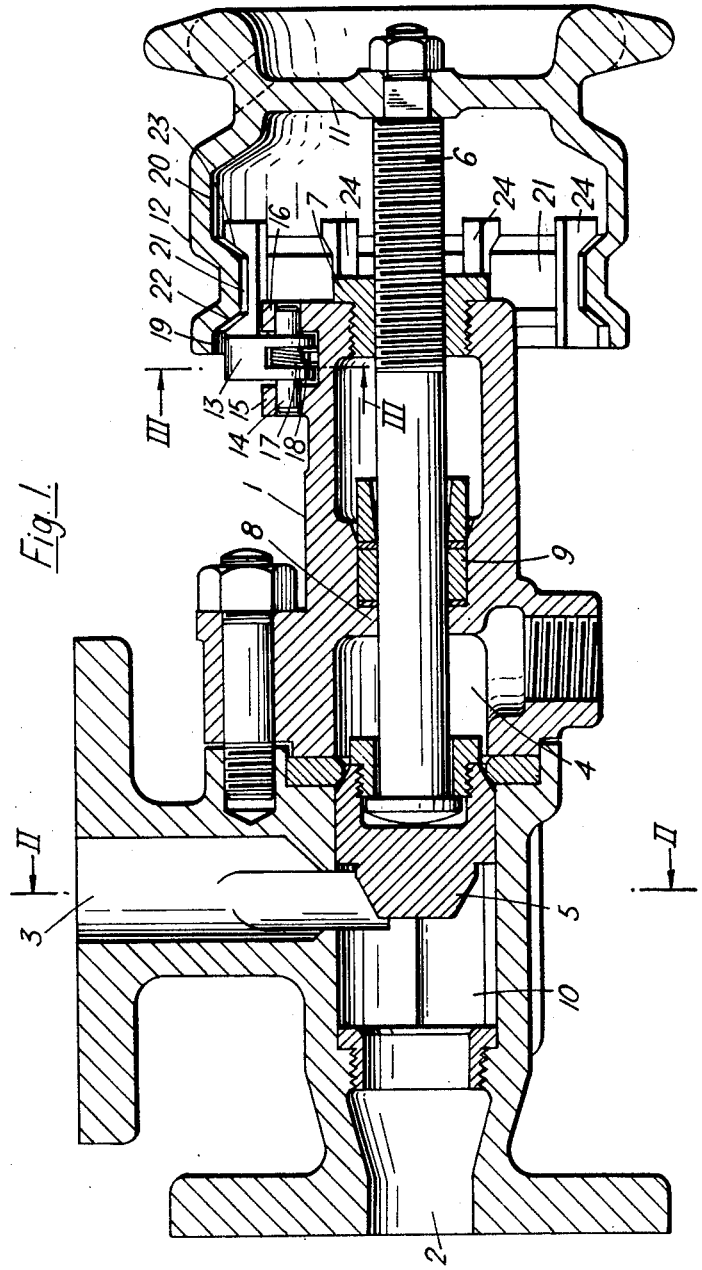

Nov. 10, 1964  A. R. J. HARDING  3,156,217
SEQUENCING BOILER BLOW-DOWN MEANS
Filed Nov. 21, 1962  3 Sheets-Sheet 1

Inventor
Arthur Richard James Harding
By
Bailey, Stephens- Huettig
Attorneys

Nov. 10, 1964　　　A. R. J. HARDING　　　3,156,217
SEQUENCING BOILER BLOW-DOWN MEANS
Filed Nov. 21, 1962　　　　　　　　　3 Sheets-Sheet 2

Inventor
Arthur Richard James Harding
By
Bailey, Stephens & Huettig
Attorneys

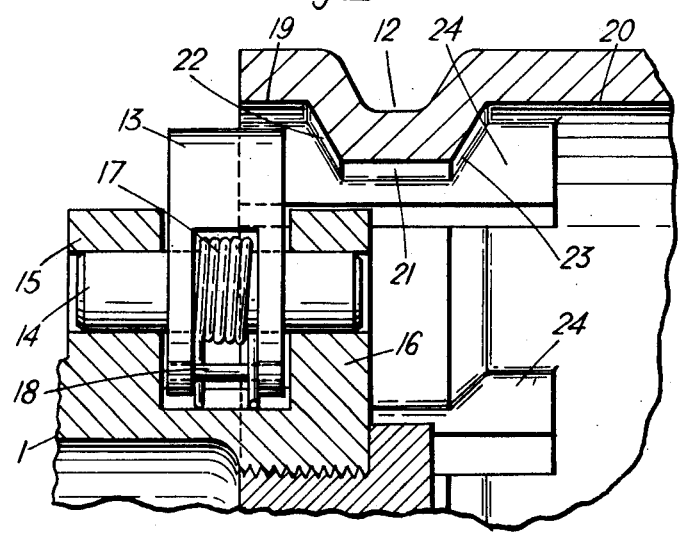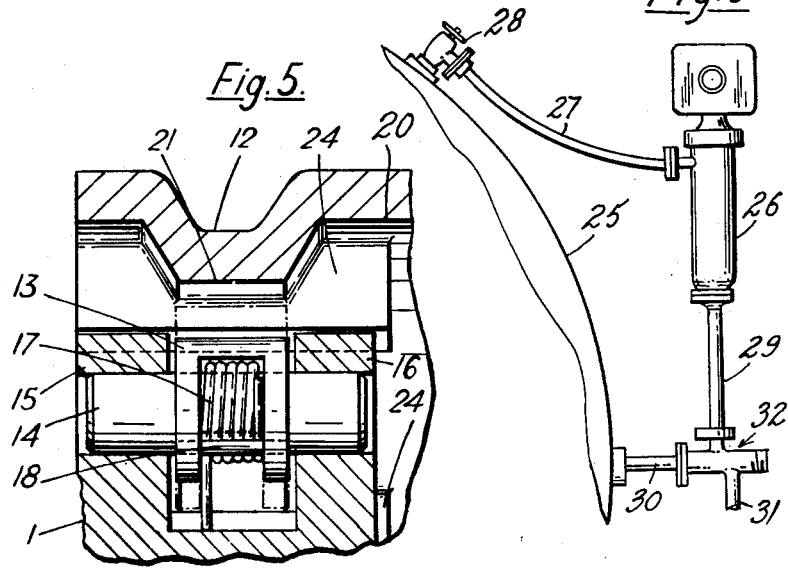

United States Patent Office 3,156,217
Patented Nov. 10, 1964

3,156,217
SEQUENCING BOILER BLOW-DOWN MEANS
Arthur Richard James Harding, Slough, England, assignor to Ronald Trist & Co., Limited, Slough, England, a British company
Filed Nov. 21, 1962, Ser. No. 239,243
Claims priority, application Great Britain, Nov. 27, 1961, 42,338/61
3 Claims. (Cl. 122—382)

This invention relates to plants of the kind that includes both a boiler or similar vessel, e.g. an evaporator, containing liquid and vapour under pressure and an auxiliary chamber that houses a level controller, a feed-water regulator or an alarm mechanism and that is connected to the vapour and liquid spaces of the vessel. In such a plant it is important that the chamber should be blown down periodically so as to remove deposited solids which might interfere with its operation. The connections between the vessel and the chamber, which may be called the vapour and liquid legs respectively, are usually valve-controlled pipes, and a valve-controlled blow-down pipe which discharges to waste is connected to the bottom of the chamber. This blow-down pipe is often the head of a T, the liquid leg being the stem of the T and joining the blow-down pipe upstream of the valve in it. In normal operation the valves in the vapour and liquid legs are both open and the blow-down valve is closed. The sequence of operations on blow-down is to close the valve in the liquid leg, open the blow-down valve so that the liquid and suspended solids in the chamber are discharged to waste and subsequently vapour from the vessel passes through the chamber to scour it and pass to waste, open the valve in the liquid leg so that this leg is flushed by liquid which also runs to waste, and finally close the blow-down valve to restore the whole system to its normal running state.

In practice it sometimes happens that the operator forgets to open the valve in the liquid leg after blowing the chamber down, so that only the vapour leg is open to the vessel. The result is that the regulator or alarm ceases to operate properly and the effects may be disastrous.

British Patent No. 877,445 describes such a plant in which a single rotary multi-position valve controlling the liquid leg and blow-down pipe is provided and is connected to and preferably operated through a ratchet mechanism or other one-way device so that it must pass through a position in which the chamber is blown down and another position in which the liquid leg is blown down before it can re-enter its starting or normal position. During blowing-down there is discharge of liquid and vapour through the blow-down pipe, and this inevitably calls the attention of the operator to the fact that blowing-down is still proceeding, and he cannot restore it to its normal position without completing the cycle of movements.

In practice I have found that in the single rotary multi-port valve disclosed in British Patent No. 877,445 it is difficult to maintain a good seal such as is required to prevent wire-drawing and consequent erosion of the sealing faces.

I have further found that these disadvantages can be entirely avoided by using a reciprocating slide valve so connected to the one-way device that once its reciprocating movement starts it must pass through the two positions, i.e. that in which the chamber is blow down and that in which the liquid leg is blown down, before it can return to its starting position. It will inevitably pass through one of these twice, once on one stroke and once on the other.

Figure 2:
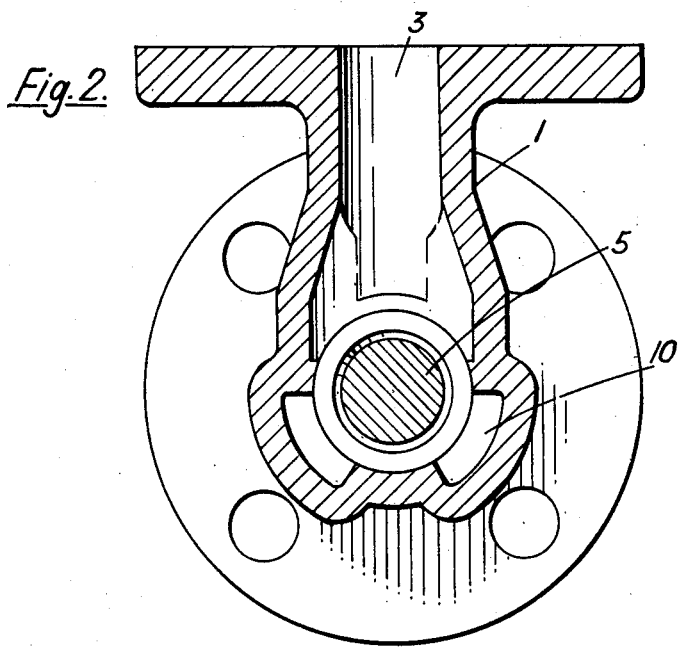
Figure 3:
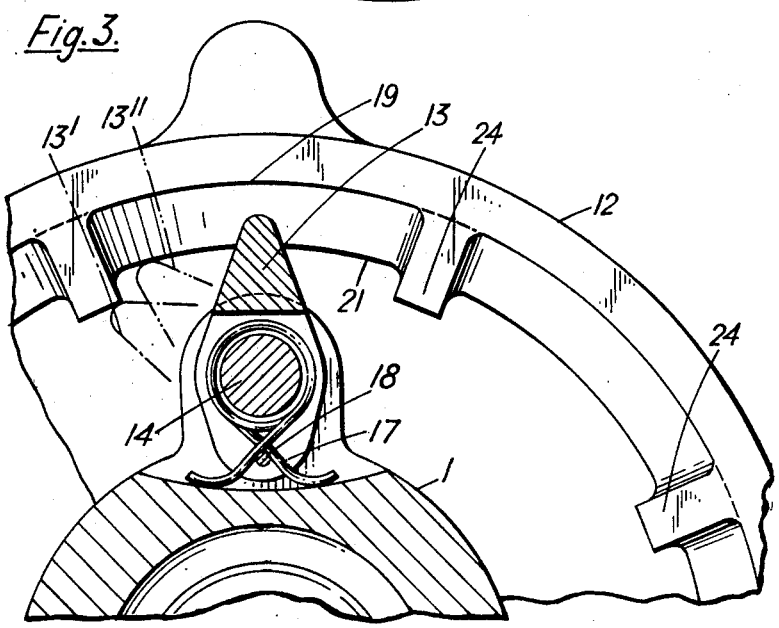

My invention will be better understood from the following description of the preferred construction, taken in conjunction with the annexed drawings, in which:
FIGURE 1 is a longitudinal section through the valve;
FIGURE 2 is a cross-section on the line II—II in FIGURE 1;
FIGURE 3 is a section on a larger scale on the line III—III in FIGURE 1;
FIGURES 4 and 5 show two different working positions on the same scale as FIGURE 3; and
FIGURE 6 is a diagrammatic view of part of a boiler with which the valve is used.

Referring first to FIGURE 6, the steam space of a boiler 25 is connected through a valve 28 and a pipe 27 to an auxiliary chamber 26 housing a level controller. A pipe 29 extends downwards through the bottom of the chamber 26 to a valve indicated generally at 32. The water space of the boiler is connected by a pipe 30 to the same valve 32. A pipe 31 runs from the valve 32 to drain.

The valve 32 shown comprises a hollow casing 1 made in two parts bolted together and shaped to provide an end inlet port 2 to which the pipe 30 is connected, a lateral inlet port 3 to which the pipe 29 is connected and an L-shaped discharge port 4 to which the pipe 31 is connected. The ports 2, 3 and 4 are controlled by a valve member 5 carried by a threaded stem 6 which passes through and engages an internally threaded bush 7 fixed in the casing and coaxial with the port 2. The casing 1 has an internal wall 8 through which the stem 6 passes and which serves as an abutment for packing 9 by which a tight seal is made around the stem.

The casing 1 is formed with two longitudinal grooves 10 in its sides, and these grooves provide a passage from the port 2 to the port 4 past the member 5 when this member is in any position between its end positions.

The valve stem 6 carries an operating wheel 11 forming the rotary member referred to above. This wheel 11 has a skirt 12 which cooperates with a pawl 13 to ensure that once the valve member has opened either end port and is moving towards the other it cannot be reversed in its movement until it reaches the other end port.

The pawl 13 is of inverted U shape. It is carried by a pin 14 which passes through the legs of the U and enters the openings in lugs 15 and 16 which extend upwards from the casing 1. Between the legs of the U the pin 14 is surrounded by a coiled spring 17, the free ends of which pass one on each side of a pin 18 that also spans the arms of the U and bear on the casing 1 as shown in FIGURE 3. This spring acts as a centralizing device against which the pawl 13 can be rocked and which tends always to return the pawl to the position shown in full lines in FIGURE 3.

The skirt 12 is internally shaped to present two internal cylindrical surfaces 19 and 20 with a third cylindrical surface 21 between them, this surface being of lesser diameter than the others, and merging into them through inclined surfaces 22 and 23. The skirt 12 is also formed with a series of ratchet teeth 24 which project inwardly beyond the surface 21 and extend axially beneath the surface 19 and part of the surface 20.

In the starting position of the valve, shown in FIGURES 1 and 4, the pawl 13 lies within the part of the skirt 12 bounded by the surface 19, and can be rocked freely in either direction against the spring 17. In the other end position of the valve member 5 and stem 6 the pawl 13 lies within the part of the skirt bounded by the surface 20. When the wheel 11 is turned from the end position shown one of the teeth 24 engages the pawl 13 and deflects it, and immediately thereafter the inclined surface 22 enters into register with the pawl with the result that the pawl cannot return to its starting position. In FIGURE 3 the position of the pawl indicated by 13' is that to which it is deflected by a tooth 24, which then rides over the pawl. Thereupon the pawl tends to return to its starting position, but can get no further than the position shown at 13" because it strikes the surface 22 and subsequently the surface 21. In this position it prevents rotation in the reverse direction, but can still be deflected to the position 13' to allow successive teeth to pass over it, so that continued rotation in the original direction is possible. FIGURE 5 shows the valve in the middle of its stroke, with the pawl engaged by the surface 21. As the valve member 5 approaches its other extreme position, the surface 21 ceases to register with the pawl 13, and when the surface 20 is brought into register with the pawl reverse rotation becomes possible again.

In the position shown in FIGURE 1 the blow-down port 4 is closed by the valve member 5, and the steam and liquid legs 27 and 29 of the boiler are in communication with one another through the auxiliary chamber 26. When blow-down is required, the wheel 11 is turned, thus initially opening all three ports and connecting both the steam and water legs to blow-down through the grooves 10 around the member 5. Continued movement of the valve member 5 closes the port 3 and shuts off the steam leg, leaving the water leg connected to blow-down through the port 2 and the grooves. Further movement of the valve to the end of its travel cuts off the water leg by closing the port 2 and reopens the steam leg 3, thus connecting this leg and the auxiliary chamber to blow-down. On the return stroke the cycle is of course reversed.

I claim:

1. In a plant including a vessel adapted to contain liquid and vapour under pressure, an auxiliary chamber, a vapour leg connecting the auxiliary chamber to the vapour space of the vessel, a blow down pipe, a liquid leg connected to the liquid space of the vessel and a valve and casing therefor, said valve having three successive positions comprising, a first position in which it connects the chamber to the liquid leg, a second position in which it connects the liquid leg to blow-down, and a third position in which it connects the chamber to blow-down, said valve comprising a reciprocating slide valve having a stem extending through one end of the casing, said casing being formed with a port at the end opposite to that through which the valve stem passes connected to the liquid leg, with a lateral port connected to the auxiliary chamber, with a second end port connected to the blow-down pipe, and with grooves opposite the lateral port communicating with both end ports, the valve being operative to close one end port in one extreme position, thus connecting the chamber to the liquid leg, to close the other end port in the other extreme position thus connecting the chamber to blow-down and in an intermediate position between the two extreme positions to close the lateral port while the end ports communicate with each other through the grooves, thus connecting the liquid leg to blow down.

2. In a plan as claimed in claim 1, a one-way device operatively connected to said slide valve to ensure that once this valve starts its reciprocating movement from the said first position it must pass through the said second and third positions before it can return to its starting position.

3. In a plant including a vessel adapted to contain liquid and vapour under pressure, an auxiliary chamber, a vapor leg connecting the auxiliary chamber to the vapor space of the vessel, a blow-down pipe, a liquid leg connected to the liquid space of the vessel, a reciprocating slide valve having three successive positions comprising a first position in which it connects the chamber to the liquid leg, a second position in which it connects the liquid leg to the blow-down, and a third position in which it connects the chamber to blow-down while closing the liquid leg, and a one-way device operatively connected to the slide valve comprising a rotary member which is turned to move the valve and travels with the valve, a pawl mounted for engagement with the rotary member to be brought by turning of the member into a position in which it prevents reverse rotation immediately after the slide valve has started its stroke and to come out of that position just before the slide valve completes its stroke.

References Cited in the file of this patent
UNITED STATES PATENTS 1,814,907    Dugan _____ July 14, 1931

FOREIGN PATENTS 877,445    Great Britain _____ Sept. 13, 1961